Aug. 29, 1967 W. B. KIRK ET AL 3,338,638
EMPTY AND LOAD BRAKE APPARATUS
Filed March 25, 1965 2 Sheets-Sheet 1
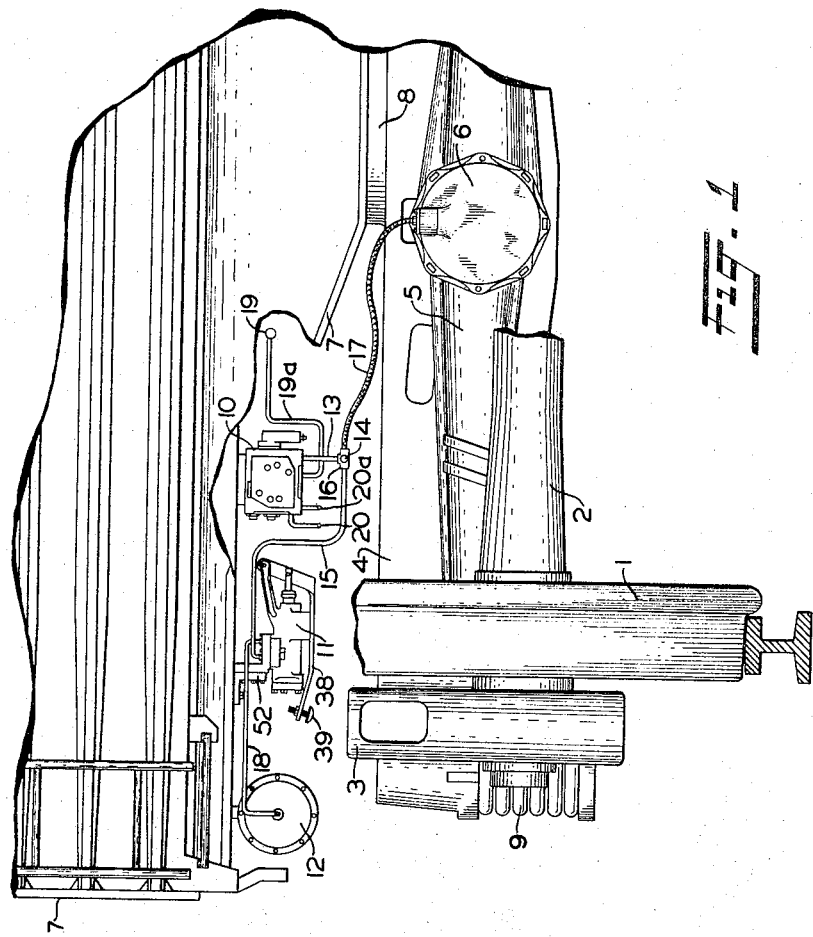
INVENTOR.
WALTER B. KIRK
FRED TEMPLE
BY
*A. A. Steinmiller*
ATTORNEY

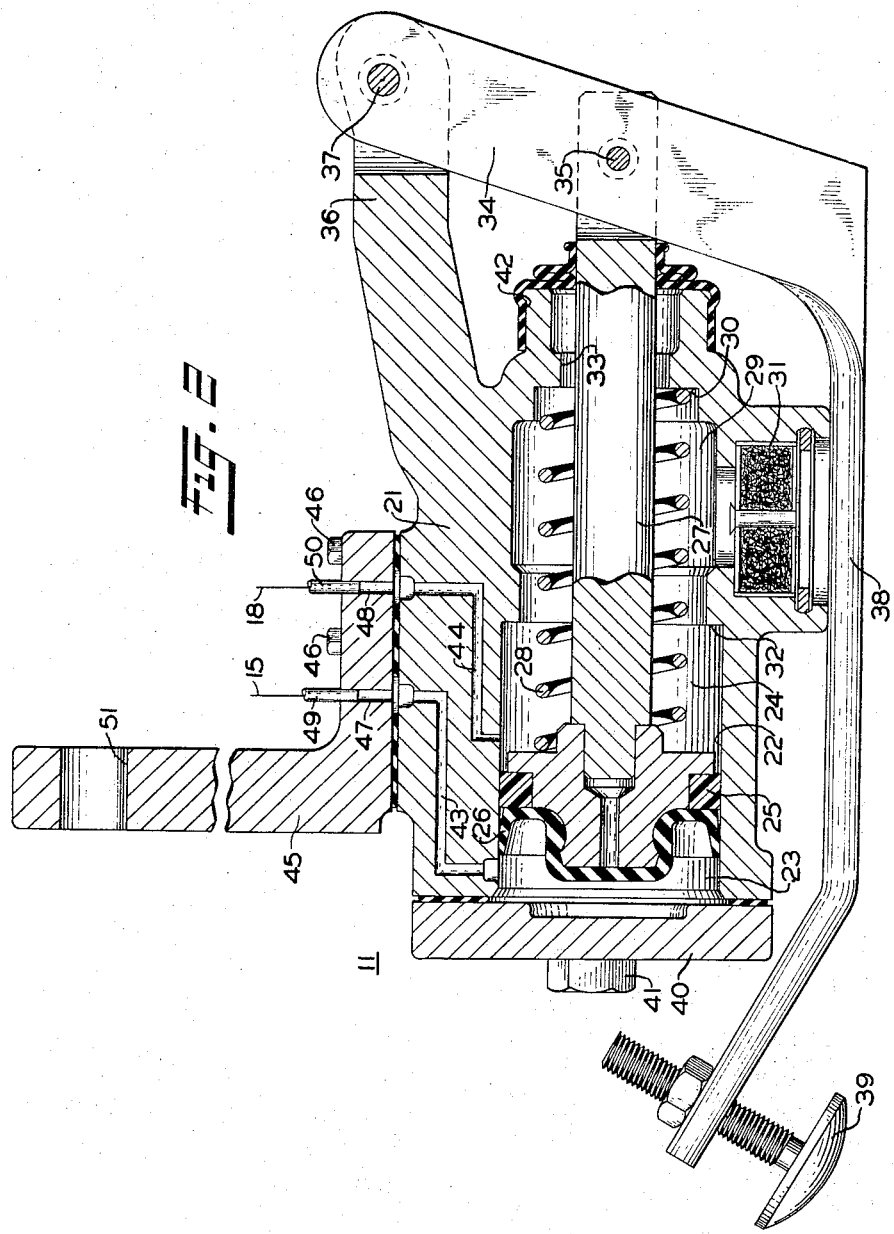

United States Patent Office 3,338,638
Patented Aug. 29, 1967

3,338,638
EMPTY AND LOAD BRAKE APPARATUS
Walter B. Kirk, Pitcairn, and Fred Temple, Pittsburgh, Pa., assignors to Westinghouse Air Brake Company, Wilmerding, Pa., a corporation of Pennsylvania
Filed Mar. 25, 1965, Ser. No. 442,646
1 Claim. (Cl. 303—22)

This invention relates to empty and load brake apparatus for railway rolling stock, and, more particularly, to empty and load brake apparatus for freight cars equipped with foundation brake rigging mounted on the car truck and having the brake cylinders carried directly on the brake beams in a manner to effect application of brake shoes to the wheels of the car truck by reaction between the beams or between the beams and the truck bolster.

Patent No. 2,958,398, issued Nov. 1, 1960, to George K. Newell and assigned to the assignee of the present application, discloses a recently developed type of freight car truck foundation brake rigging, now in service, wherein each brake beam of a pair on a car truck carries a brake cylinder, with the piston rods of the cylinders extending in parallel-spaced relation, symmetrically on opposite sides of the longitudinal center line of the car truck, and through the truck bolster to the other brake beam such that when fluid pressure is supplied to said cylinders the brake beams move away from each other and thereby apply the brake shoes on the beams to the treads of the car wheels.

The aforesaid basic foundation brake rigging operates to provide a uniform braking force for a given brake cylinder pressure regardless of load on the car. Accordingly, various proposals have been made for providing "empty and load" operation in the aforesaid type of foundation brake rigging.

One arrangement which has been proposed for adapting this described type of foundation brake rigging for so-called "empty and load" operation is of a pneumatic type employing a pneumatically operated strut cylinder to measure the "empty" or "load" condition of a car, by the degree of deflection of a part such as the bolster which deflects downwardly with load and called the "sprung part" of a car truck with respect to a part of the truck which does not change in height with load and called the "unsprung part." This strut cylinder operates to condition a combination change-over valve and relay valve to correspondingly control the degree of braking pressure supplied to the brake cylinders. This type of equipment is operatively effective, but the cost of this additional apparatus discourages its use.

Another arrangement for providing "empty and load" operation to this type of foundation brake rigging is of a relatively simple, low-cost mechanical construction wherein a lever actuated by the beam-carried brake cylinder piston cooperates with a vertically inclined fulcrum rib on the bolster of the car truck, so as to increase the mechanical advantage of the piston-operated lever with increasing deflection of the sprung part of the car truck as load on the truck increases, thereby correspondingly increasing the brake force. This type of apparatus is also operatively effective, but requires a special design of the basic foundation rigging, involving repositioning of the brake cylinders on the beams, and is not readily adapted to the basic foundation brake rigging hereinbefore described.

Other apparatus has been proposed but requires alteration of the bolster design to accommodate a load measuring strut device.

It is the purpose of the present invention, therefore, to provide a relatively simple, low-cost arrangement which is partly mechanical and partly pneumatic in character, for adapting the hereinbefore-described basic foundation brake rigging for "empty and load" operation without requiring alteration of the basic foundation brake rigging or modification of the bolster design.

According to the present invention, a detector valve, attached to the underside of the car body, is provided for selectively controlling connection of each piston pressure chamber of each brake-beam-carried brake cylinder to, and disconnection from a displacement volume or reservoir depending upon the load condition of the car. A spring-biased piston subject to brake cylinder pressure in a cylinder of the detector valve has a stem or rod which operates a lever arm responsively to brake cylinder pressure during a brake application to move an adjustable stop thereon into movement restricting contact with the car truck side frame if sufficient downward deflection of the car body occurs due to load. Under an "empty" condition brake cylinder pressure acting on the face of the piston of the detector valve shifts the piston of the detector valve but, due to the car body being elevated, the adjustable stop on the connected lever arm does not engage the side frame to restrict movement of the lever arm. Shifting of the piston, in this case, uncovers a communication to a displacement volume or reservoir to provide additional brake cylinder volume and thereby limit the brake cylinder pressure for a given brake pipe pressure reduction. Under "load" condition, the communication to the displacement volume is not uncovered due to restricted movement of the lever arm and, consequently, a higher braking pressure is developed in the brake cylinder for a given reduction in brake pipe pressure.

In the accompanying drawings:

FIG. 1 is a fragmental elevational end view of a freight car, showing brake rigging of the type with the brake cylinder carried in the brake beam and the detector valve installed on the underside of the car body above the side frame, and FIG. 2 is an enlarged fragmental vertical sectionel view of the detector valve and connected lever arm.

Referring to FIG. 1 of the drawings, there is shown a fragmental end elevational view of a freight car, including a wheel 1 and axle 2 on a car truck having a side frame 3 and a bolster 4. A foundation brake rigging is carried on the car truck and includes a pair of brake beams 5 (one of which is shown), on each of which a brake cylinder 6 is carried. Part of the car body 7 is shown as conventionally supported on the bolster 4 at a center bearing 8. Car springs 9 support the opposite ends of bolster 4 on side frames 3, only one of which is shown.

Suitably mounted on the underside of the car body 7 are the conventional brake controlling device 10 of the AB type, the detector valve 11 and a displacement reservoir 12. The brake controlling device 10 is connected by a pipe 13 to the brake cylinder pipe 14 (of which only the end is shown) extending lengthwise along the car such that each brake cylinder on the car may be connected thereto, as explained hereinafter. A pipe 15 is connected from the detector valve 11 to the brake cylinder pipe 14 at a fitting 16, and a flexible pipe 17 connects each brake cylinder 6 (only one of which is shown in FIG. 1) to the brake cylinder pipe 14. The detector valve 11 is connected to the displacement reservoir 12 by a pipe 18. A conventional brake pipe 19 extends the length of the car and is connected to the brake controlling device 10 by a branch pipe 19a. Other pipes 20 and 20a lead from the brake controlling device 10 to the usual auxiliary reservoir and emergency reservoir (not shown).

Referring to FIG. 2, the detector valve 11 comprises a valve body 21 having a cylinder bore 22 therewithin, forming a pressure chamber 23 and a non-pressure chamber 24 on opposite sides of a piston 25 which is slidable within said cylinder bore. The piston 24 carries a suitable packing cup and is subject on the packing cup side to fluid pressure in the pressure chamber 23 and on the opposite side to the force of a coil spring 28, encircling an attached piston stem 27 that extends through the non-pressure chamber 24 and a spring chamber 29 to a spring seat 30. The spring chamber 29 is connected to atmosphere by way of a filter 31 in a vent hole in the valve body 21. A piston stop 32, in the form of an annular shoulder formed on the inner surface of the cylinder bore 22 between the non-pressure chamber 24 and the spring chamber 29, limits the travel of the piston 24, as will be explained. Constant communication is maintained between said non-pressure chamber 24 and the spring chamber 29 and to atmosphere via the filter 31.

The piston stem 27 extends from the piston 24 through the non-pressure chamber 24, through the spring chamber 29, and through an opening 33 in the wall of the valve body 21 at the spring seat and has a slot in the end which receives a lever 34 to which it is pivotally connected, as by a pin 35. The lever 34 is pivotally secured in a slot in an extension arm 36 on the top of valve body 21, as by a pin 37 or bolt, in a manner such that any movement of the piston 25 is transmitted to the lever 34 via the piston stem 27. A lever arm 38 extends approximately perpendicular to the lever 34 at the outer end thereof in a manner to pass under the valve body 1 and then tilts slightly upward with an adjustable stop 39 threaded into the outer end of the lever arm 38.

An end plate 40 is secured to one end of the valve body 21, as by bolts 41, to form one end of the pressure chamber 23, while a dust or dirt excluding sleeve or boot 42 encircling the piston stem is frictionally slipped over a cylindrical protrusion on the opposite end of the valve body 21.

A pair of passages 43 and 44 in the valve body 21 lead from the pressure chamber 23 and the non-pressure chamber 24, respectively, to the outside of the valve body. An L-shaped supporting bracket 45 is sealingly secured to the top of the valve body 21, as by screws 46, and has two passages 47 and 48 therethrough in alignment with the passages 43 and 44. Pipe fittings 49 and 50 are fitted into the threaded passages 47 and 48 to receive the pipes 15 and 18 (FIG. 1), respectively. The bracket 45 is provided with holes 51 through which suitable bolts extend to secure the valve body 21 to a mounting bracket 52 (FIG. 1) on the underside of the car.

The detector valve 11 is located on the underside of the car at a position where the adjustable stop 39 on the lever arm 38 will engage the top edge of side frame 3 during a brake application under load conditions, as explained hereinafter. The detector valve 11 is positioned above the top edge of the side frame 3 at a distance sufficient, when the car is empty, to permit the lever arm 38 to move its entire swing (responsively to a brake application) without the adjustable stop 39 contacting the side frame 3.

It should be understood that the bolster 4 is supported by the coil springs 9 on the "unsprung" truck side frame 3 in a usual well-known manner, such that the bolster 4 and the car body 7 riding on the center bearing 8 thereof will be biased downwardly toward the tracks with the compression of the coil springs 9 when the car is loaded. With downward movement of the car body 7, the detector valve 11 will be moved downwardly toward the side frame 3, reducing the clearance therebetween such that movement of the adjustable stop on the lever arm will be limited by engaging the side frame 3 during brake applications to thereby correspondingly alter the effective braking force, in a manner described hereinafter. Due to the reduced clearance between the detector valve 11 and the side frame 3 under "load" condition, the lever arm 38 is constructed with a sufficient degree of resiliency to flex and provide a cushioning effect to prevent bending thereof should the lever arm 38 accidentally engage the side frame 3 due to undesired bouncing of the car. During brake application, the fluid under pressure in the pressure chamber 23 also adds a slight degree of cushioning effect to the lever arm 38 during undesired bouncing of the car.

When it is desired to effect a brake application, the brake controlling device 10 is operated, by reduction of the fluid under pressure in the brake pipe 19 in a conventional manner, to cause fluid under pressure to be supplied from the auxiliary reservoir via auxiliary reservoir pipe 20 to the brake cylinder pipe 14 and thence by flexible pipes 17 to each brake cylinder 6 on the car. Simultaneously, with the supply of fluid under pressure from the brake cylinder pipe 14 to the brake cylinders 6, fluid under pressure is supplied via pipe 15, passages 47 and 43, to the pressure chamber 23 of the detector valve 11.

The supply of fluid under pressure to the brake cylinders 6 causes the pistons and piston push rods thereof (not shown) to move the brake beams and the brake shoes (not shown) into a brake application position, engaging the tread of the wheels 1 in the usual well-known manner.

With the car in "empty" or lightly loaded condition, the detector valve 11 is vertically positioned a substantial distance above the car side frame 3, as shown in FIG. 1.

As the fluid under pressure is supplied to the pressure chamber 23 of the detector valve during a brake application as before described, the resistance of the spring 28 prevents movement of the piston 25 until approximately 35 to 40 pounds pressure is obtained therein to overcome the force of the spring 28 and move the piston 25 to the right (as viewed in the drawings) the entire length of the non-pressure chamber 24 until the passage 44 is uncovered, that is, passed by the piston 25 and connected to pressure chamber 23. It will be understood that this rightward movement of the piston 25 the entire length of the non-pressure chamber 24 is permitted because the car is empty, and the detector valve 11 is therefore positioned sufficiently high enough above the side frame 3 to allow the lever arm 38 of the lever 34 to pivotally swing downward freely with the rightward movement of the piston 25 and the piston stem 27, without engagement by the adjustable stop 39 with the top edge of side frame 3.

When the passage 44 is uncovered as described, the fluid under pressure in the pressure chamber 23 is permitted to flow via passage 44, passage 48 and pipe 18 to the displacement reservoir 12, thereby communicating the additional volume of displacement reservoir 12 to the volume of the brake cylinder pressure chambers (not shown). Thus, the resultant equilization pressure obtained for a given reduction of brake pipe pressure and corresponding operation of the brake controlling valve device 10 is lower with the addition of the displacement reservoir volume than it is for the brake cylinder pressure chamber (not shown) only. As the fluid under pressure in the pressure chamber 23 is vented to the displacement reservoir 12, a pressure equilization therebetween occurs. If the pressure equilization occurs at a pressure less than the opposing force of the spring 28, the spring 28 will cause the piston 25 to be moved back to the left a small amount to close the passage 44 in lap position and thereby limit the fluid pressure effective in the connected brake cylinder to the approximate 35 to 40 pounds for safely braking an empty car without danger of wheel sliding. If the pressure equilization occurs at a pressure greater than the opposing force of the spring 28, the communication between the pressure chamber 23 and the displacement reservoir 12 will be maintained open during the brake application. When the brakes are released, the brake cylinders and connected pressure chamber 23 are vented by the brake controlling valve device 10 in the well-known manner, thereby causing the piston 25 to shift all the way to the left in the pressure chamber 23 (as shown) under the biasing force of the spring 28. As the piston 25 is moved to the left, the passage 44 is uncovered to cause venting of the displacement reservoir 12 to atmosphere via the non-pressure chamber 24, spring chamber 29 and the filter 31.

As previously decribed, when the car is in a "load" condition, the weight of the load will be sufficient to move the car body downwardly toward the side frame 3 as the coil springs 9 are compressed. This downward movement of the car body moves the detector valve 11 sufficiently near to the top of the side frame that only limited movement of the lever arm 38 occurs before the adjustable stop 39 engages the side frame 3.

When a brake application is effected under the "load" condition, the operation is similar to that described when the car is empty, with the exception that, in this case, the supply of fluid under pressure to pressure chamber 23 of the detector valve 11 will move the piston 25 and piston stem 27 to the right only a small distance, due to the fact that the lever arm 38 of the connected lever 34 is limited in its downward pivotal movement by engagement of the adjustable stop 39 with the top edge of side frame 3. Engagement of the adjustable stop 39 with the side frame 3 prevents the increasing of the effective volume of the brake cylinder pressure chambers (not shown) by venting to the displacement reservoir 12, as previously explained, due to the fact that the piston 25 cannot be moved far enough to uncover the passage 44 leading to the displacement reservoir 12. Accordingly, without the additional volume, the equalization pressure in the brake cylinders for a given brake pipe pressure reduction and corresponding operation of the brake controlling valve device 10 is correspondingly higher, such that a higher degree of braking is obtained when the car is under "load" condition, as desired.

It should be noted that equalization pressure in the brake cylinder in "empty" condition can be varied by variation in the size of the displacement volume. Likewise, it will be seen that variation in the change-over from "empty" to "load" braking may be effected by adjusting the adjustable stop 39 such that it engages the side frame 3 with either a lesser or greater degree of movement of the lever arm 38, as desired.

The use of the lever 34 and lever arm 38 with the adjustable stop 39 permits use of a relatively small pressure chamber 23 and, therefore, a relatively small detector valve 11.

It will be understood that while the invention has been described particularly for use in connection with the new design of truck mounted brake rigging, it is not limited to such use as it will be apparent that the invention is readily adapted for use in connection with existing conventional freight car body mounted brake rigging including a single car body mounted brake cylinder.

Having now described the invention, what we claim as new and desire to secure by Letters Patent, is:

Empty and load brake control apparatus for use on railway car of the type having the car body supported in resilient sprung relationship to the unsprung portion of the car, said apparatus comprising:

(a) a brake cylinder effective to cause a brake application according to the degree of pressurization thereof,
(b) a displacement reservoir, and
(c) detector valve means, carried by the car body, comprising
   (i) a cylinder,
   (ii) a piston valve means, operable in said cylinder, having a pressure chamber at one side subject to pressure established in the brake cylinder, and a second chamber on the side of said piston valve means opposite to said pressure chamber, which second chamber is constantly vented to atmosphere and normally connected to said displacement reservoir,
   (iii) biasing means opposing movement of the piston valve means by the fluid pressure in the said pressure chamber,
   (iv) lever means actuated by the piston valve means from a retracted to an extended position responsively to fluid pressure exceeding a value sufficient to overcome the force of said biasing means,
   (v) said lever means engaging the unsprung part of the car to block operation of the piston valve means when the load on the car exceeds a certain load, responsive to supply of fluid under pressure to the brake cylinder, and being free to move without engaging the unsprung part of the car, responsively to supply of fluid under pressure to the brake cylinder when the load on the car is less than said certain load,
   (vi) said piston valve means being operative to disconnect said displacement reservoir from said second chamber and establish communication between said displacement reservoir and the said pressure chamber in said cylinder of said detector valve means only when said lever means is free to move to its extended position responsive to supply of fluid pressure to the brake cylinder, and being non-operative to establish communication between the displacement reservoir and the said pressure chamber when the lever is blocked against movement to its extended position responsive to supply of fluid pressure to the brake cylinder.

References Cited

UNITED STATES PATENTS 2,958,398   11/1960   Newell    188—52

FOREIGN PATENTS 602,382   5/1948   Great Britain.

EUGENE G. BOTZ, *Primary Examiner.*